(12) United States Patent
Douglas

(10) Patent No.: US 9,309,821 B2
(45) Date of Patent: Apr. 12, 2016

(54) ENGINE VALVE LIFT CONTROL SYSTEMS AND METHODS FOR REDUCED FUEL CONSUMPTION

(75) Inventor: Scot A. Douglas, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2057 days.

(21) Appl. No.: 12/484,415

(22) Filed: Jun. 15, 2009

(65) Prior Publication Data

US 2010/0318278 A1 Dec. 16, 2010

(51) Int. Cl.
*F02D 41/00* (2006.01)
*G01F 9/00* (2006.01)

(52) U.S. Cl.
CPC ...... *F02D 41/0002* (2013.01); *F02D 2041/001* (2013.01); *F02D 2041/002* (2013.01); *G01F 9/00* (2013.01); *G01F 9/001* (2013.01); *Y02T 10/42* (2013.01)

(58) Field of Classification Search
CPC ............. F02D 41/0002; F02D 41/002; F02D 41/2467; F02D 2041/001; F02D 2041/002; F02D 2013/0207; G01F 9/00; G01F 9/001
USPC .................. 123/478, 480; 702/182, 187, 188; 701/102–104, 110, 115; 73/114.52, 73/114.53

See application file for complete search history.

(56) References Cited

FOREIGN PATENT DOCUMENTS

JP 2005180350 A * 7/2005 .............. F02D 13/02

OTHER PUBLICATIONS

Watanabe, Satoshi, Variable-Valve System Control Device for Engine JP 2005180350 Jul. 7, 2005 English Translation.*
U.S. Appl. No. 11/769,797, filed Jun. 28, 2007, Michael Livshiz.

* cited by examiner

*Primary Examiner* — Hieu T Vo
*Assistant Examiner* — Sherman Manley

(57) ABSTRACT

A fuel control system of an engine includes a fuel economy module. The fuel economy module determines a first valve lift state and a second valve lift state of a valve of the engine. The fuel economy module generates a first fuel consumption signal based on the first valve lift state and an engine torque request signal, and generates a second fuel consumption signal based on the second valve lift state and the engine torque request signal. The fuel control system also includes a valve lift state module. The valve lift state module selects one of the first valve lift state and the second valve lift state based the first fuel consumption signal and the second fuel consumption signal. The valve lift state module generates a valve lift select signal. The valve lift select signal indicates the selected one of the first valve lift state and the second valve lift state.

20 Claims, 3 Drawing Sheets

ENGINE VALVE LIFT CONTROL SYSTEMS AND METHODS FOR REDUCED FUEL CONSUMPTION

FIELD

The present invention relates to variable valve lift control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) is powered by combustion energy generated in cylinders of the ICE. The cylinders have respective intake and exhaust valves. An air/fuel mixture may be received through the intake valves, and exhaust gas is removed from the cylinders through exhaust valves. The intake and exhaust valves may be actuated by cams on a camshaft. The camshaft may be driven by a crankshaft via one or more timing belts, gears and/or chains. The cams open the intake and exhaust valves at respective angular displacements of the camshaft during intake and exhaust strokes. The opening of a valve may include the lifting of a valve away from a cylinder, referred to as valve lift. The amount of time that a valve is opened is referred to as valve lift duration.

Extent of valve lift and valve lift duration may be based on a cam profile. The cam profile, characterized by contour shape and angular position relative to a camshaft, may be designed for a particular engine operating at a particular engine speed. Once the cam profile is determined and the engine is assembled, the cam profile may be used for all engine operating speeds.

A fixed cam profile may provide limited performance for speeds other than the particular engine speed for which the fixed cam profile was designed. Since a cam opens intake valves based on angular displacement of a camshaft, duration of intake valve opening can be reduced as speed of the camshaft increases. The reduced duration in intake valve opening can negatively affect engine performance. For example, an engine may need an increased amount of air when operating at an increased engine speed. For the stated reasons, a fixed cam profile that is designed for an engine speed range may not provide sufficient valve opening or lift to allow a requested amount of air to be fully received when an engine speed is greater than the engine speed range.

Variable valve lift (VVL) control systems allow multiple cam profiles to be selected to actuate intake and exhaust valves. The VVL control system may provide a larger amount of valve lift at higher engine speeds than at lower engine speeds by applying different cam profiles. Variable valve lift control can improve engine performance including increased efficiency and reduced emissions.

SUMMARY

In one respect, a fuel control system of an engine is provided. The fuel control system includes a fuel economy module and a valve lift state module. The fuel economy module determines a first valve lift state and a second valve lift state of a valve of the engine. The fuel economy module generates a first fuel consumption signal based on the first valve lift state and an engine torque request signal. The fuel economy module generates a second fuel consumption signal based on the second valve lift state and the engine torque request signal. The valve lift state module selects one of the first valve lift state and the second valve lift state based the first fuel consumption signal and the second fuel consumption signal. The valve lift state module generates a valve lift select signal. The valve lift select signal indicates the selected one of the first valve lift state and the second valve lift state.

In other features, a method of controlling fuel consumption of an engine is provided. The method includes detecting that a first valve lift state is used for a valve of the engine and a second valve lift state is not used for the valve. The method generates a first fuel consumption signal based on the first valve lift state and an engine torque request signal. The method generates a second fuel consumption signal based on the second valve lift state and the engine torque request signal. The method switches from the first valve lift state to the second valve lift state for the valve based on the first fuel consumption signal and the second fuel consumption signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
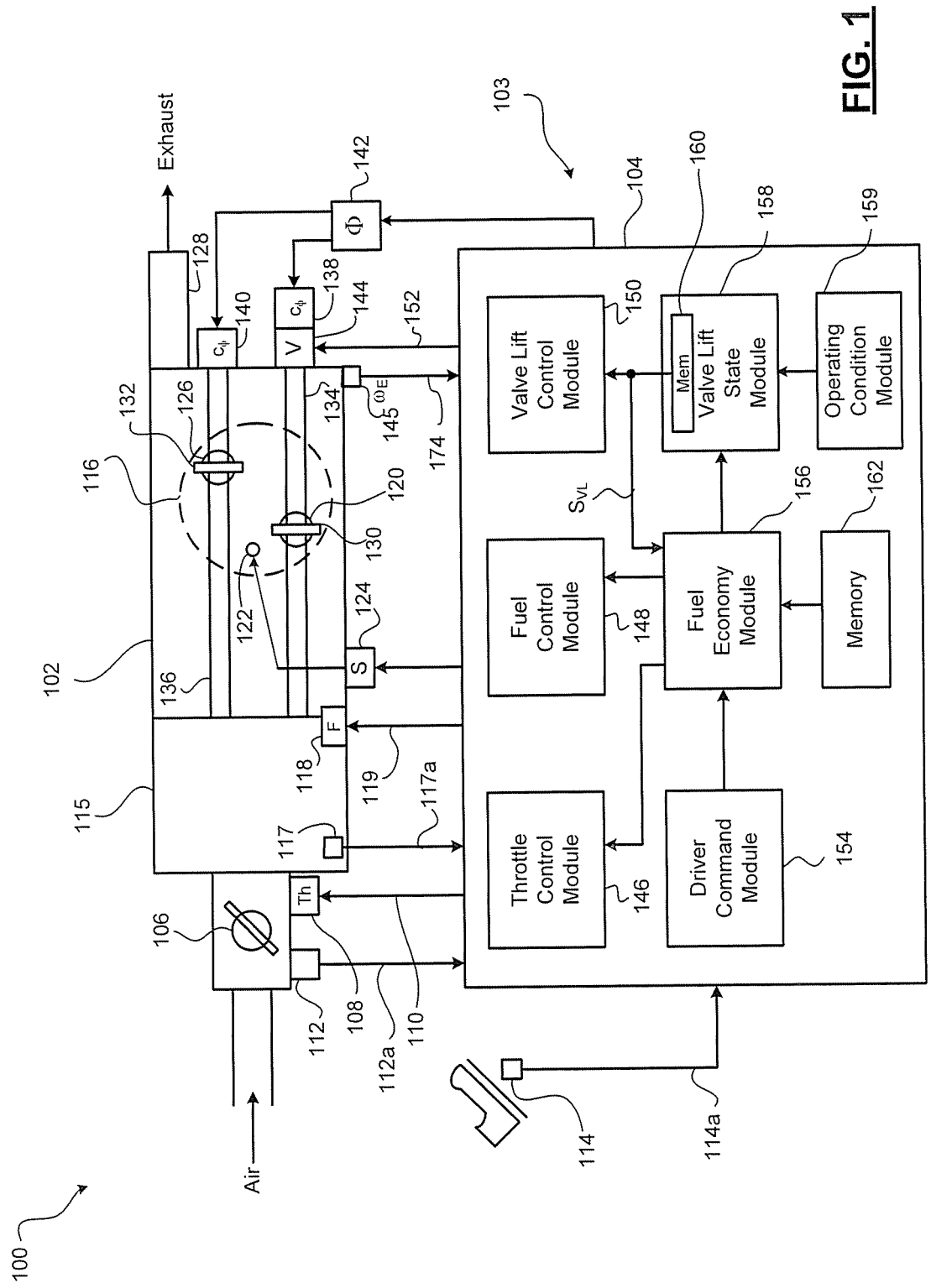
FIG. 1 is a functional block diagram of an engine control system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Variable valve lift control may include a two-step or multi-step valve lift mechanism with multiple distinct cam profiles for opening a valve. Each cam profile may be associated with a respective valve lift state. A first valve lift state may be used for engine speeds greater than a predetermined engine speed. A second valve lift state may be used for engine speeds less than a predetermined engine speed. The first valve lift state may be associated with a higher lift than the second valve lift state.

Since each cam profile determines a unique valve lift and valve lift duration, each valve lift state may result in a specific amount of air and fuel drawn into engine cylinders for combustion and power generation. Each valve lift state may result in a different degree of fuel consumption for the same requested torque output of the engine. The following disclosed embodiments provides valve lift control techniques that minimize engine fuel consumption.

Referring now to FIG. 1, a functional block diagram of an engine control system 100 is shown. The engine control system 100 includes an engine 102 and a fuel consumption control system 103 that generates control signals to provide minimal fuel consumption. The fuel consumption control system 103 includes an engine control module (ECM) 104. The ECM 104 may monitor a request of engine performance. For example, the request may be a torque output request. The ECM 104 may estimate required air and fuel to provide the requested torque output and generates valve lift state command signals to minimize fuel consumption.

The engine 102 may draw air through a throttle 106. The throttle 106 may be controlled by a throttle actuator 108. The ECM 104 may generate a throttle control signal 110 to control the throttle actuator 108. The engine 102 may include a throttle position sensor 112 that generates a throttle position signal 112a. The engine 102 may include an accelerator pedal position sensor 114 that generates an accelerator pedal position signal 114a. The ECM 104 may control the throttle actuator 108 based on the throttle position signal 112a and the accelerator pedal position signal 114a.

The engine 102 may include an intake manifold 115 and a cylinder 116. The engine 102 may include a multiple number of cylinders. For illustrative purpose only one cylinder is shown. The engine 102 may include a manifold absolute pressure (MAP) sensor 117. Fuel may be provided to the engine via a fuel actuator 118 (a fuel injector, for example). The fuel actuator 118 may be controlled by the ECM 104. The ECM 104 may generate a fuel command signal 119 to control the fuel actuator 118. Fuel may be injected into the intake manifold 115 or into the cylinder 116. Air and fuel may be mixed to form air/fuel mixtures.

The cylinder 116 may include an intake valve 120. The cylinder 116 may include more than one intake valve. The air/fuel mixture may be drawn into the cylinder 116 through the intake valve 120 when the intake valve 120 is open during an intake stroke. The air/fuel mixture may be ignited in the cylinder 116 by a spark plug 122 controlled by a spark actuator 124. The spark actuator 124 may be controlled by the ECM 104. Engine torque is produced as a result of combustion of the air/fuel mixture during the ignition stroke. Exhaust gas may be removed from the cylinder 116 through an exhaust valve 126 during an exhaust stroke, and then removed from the engine 102 through an exhaust system 128. The cylinder 116 may include more than one exhaust valve.

The intake and exhaust valves 120, 126 may be actuated by one or more intake and exhaust cams 130, 132. The intake and exhaust cams 130, 132 open the intake and exhaust valves 120, 126 and have corresponding "valve lift". The intake and exhaust valves 120, 126 are in a lifted state for a determined amount of time, referred to as "valve lift duration" during each intake and exhaust cycle, respectively. The valve lift duration may be determined based on engine speed and a predetermined angular displacement of a camshaft. The intake cam 130 may be driven by an intake camshaft 134, and the exhaust cam 132 may be driven by an exhaust camshaft 136. Alternatively, the intake and exhaust valves 120, 126 may be driven by electric solenoids. The intake and exhaust cams 130, 132 may be driven by respective electric motors.

Timing of opening and closing the valves 120, 126 may be adjusted by respective camshaft phasers 138, 140. The camshaft phasers 138, 140 may be controlled by a camshaft phaser actuator 142.

Extent of valve lift and the length of valve lift duration may be determined by a cam profile. The cam profile, characterized by angular position and contour shape on a camshaft, may be designed for yielding a maximum performance level at a predetermined engine speed. For example, one cam profile may be designed for maximum engine torque at engine speed N1, and another cam profile may be designed for minimal fuel consumption at engine speed N2.

The intake cam 130 may have multiple cam profiles for actuating the intake valve 120. The exhaust cam 132 may have multiple cam profiles for actuating the exhaust valve 126. Each cam profile may be associated with a corresponding valve lift state. For illustrative purpose only, the intake cam 130 has a first cam profile associated with a first valve lift state S1 and a second cam profile associated with a second valve lift state S2. The ECM 104 may determine the valve lift states S1, S2 and generate a valve lift select signal $S_{VL}$ to select one of the first cam profile and the second cam profile to actuate the intake valve 120. A valve lift actuator 144 may be used to apply the selected cam profile. The valve lift select signal $S_{VL}$ may be generated based on engine speed, which may be detected using an engine speed sensor 145.

The valve lift select signal $S_{VL}$ may be associated with a control schedule of an electric solenoid that opens and closes an intake or exhaust valve when the intake and exhaust valves are actuated by electric solenoids. The control schedule may determine an extent of valve opening and an time duration for the opening of the valve.

The ECM 104 may include a throttle control module 146, a fuel control module 148 and a valve lift control module 150. The throttle control module 146 performs closed-loop control of throttle position. The throttle control module 146 may perform the closed-loop control based on the throttle position signal 112a and the accelerator pedal position signal 114a. The fuel control module 148 generates the fuel command signal 119 to the fuel actuator 118. The valve lift control module 150 controls the valve lift actuator 144. The valve lift control module 150 may generate a valve lift control signal 152 for controlling the valve lift actuator 144.

The ECM 104 may include a driver command module 154, a fuel economy module 156, a valve lift state module 158 and an operating condition module 159. The driver command module 154 determines a request of torque of the engine. The driver command module 154 may generate a request signal of engine torque based on the accelerator pedal position signal 114a. The request of torque may also be generated based on an autonomous driving control that may not use the accelerator pedal position signal 114a. The fuel economy module 156 may estimate fuel consumption of the engine 102 and generate fuel consumption signals. The fuel economy module 156 may also determine selected air and fuel commands for the throttle control module 146 and the fuel control module 148, respectively. The valve lift state module 158 may generate and send the valve lift select signal $S_{VL}$ to the valve lift control module 150. The valve lift control signal 152 may be generated based on the valve lift select signal $S_{VL}$. The valve lift state module 158 may include memory 160 that stores valve lift states associated with the valve lift select signal $S_{VL}$. The valve lift select signal $S_{VL}$ may also be sent to the fuel economy module 156. The operating condition module 159 determines an engine operating condition. The operating condition module 159 may generate and send an operating condition signal to the valve lift state module 158.

Figure 2:
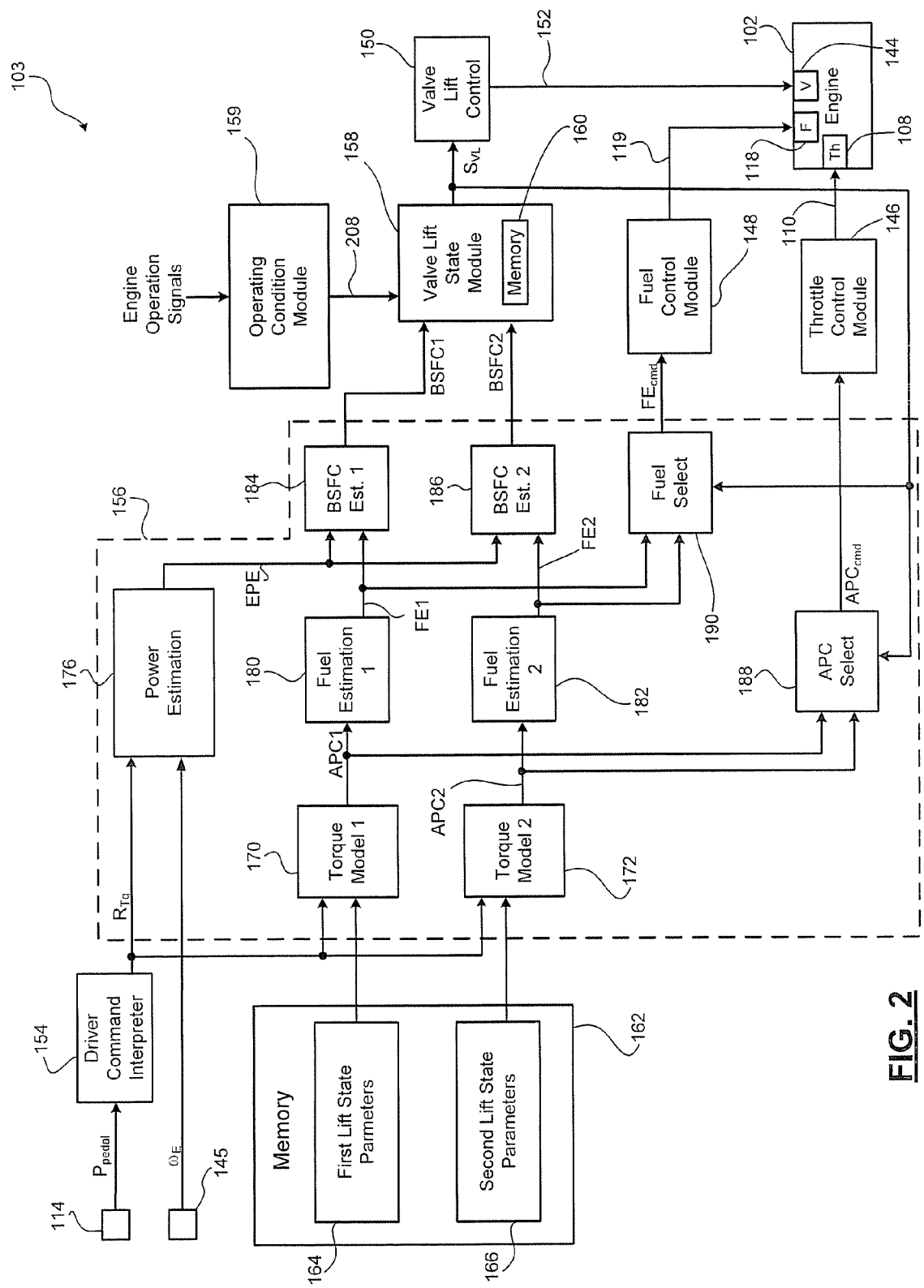
FIG. 2 is a functional block diagram of a fuel consumption control system according to the principles of the present disclosure.

Referring now also to FIG. 2, a functional diagram of a fuel consumption control system 103 is shown. The fuel consumption control system 103 includes the driver command module 154, the fuel economy module 156, the valve lift state module 158, an operating condition module 159 and memory 162.

The driver command module 154 generates a torque request signal $R_{Tq}$ based on an accelerator pedal position signal $P_{pedal}$. The accelerator pedal position $P_{pedal}$ may be generated by the accelerator pedal position sensor 114. Memory 162 may store first valve lift state parameters 164 and second valve lift state parameters 166. The first valve lift state parameters 164 are associated with the first valve lift state S1. The second valve lift state parameters 166 are associated with the second valve lift state S2. The valve lift state parameters 164 and 166 may include values of valve lift, valve timing and spark timing associated with the valve lift states S1 and S2.

The fuel economy module 156 may generate valve lift state command signals to control valve opening of a valve of the engine 102. The fuel economy module 156 may generate fuel consumption signals associated with the valve lift state command signals. The fuel economy module 156 may include a first torque module 170, a second torque module 172, a power estimation module 176, a first fuel estimation module 180 and a second fuel estimation module 182, a first BSFC module 184, a second BSFC module 186, an APC select module 188 and a fuel select module 190.

The first and second torque modules 170 and 172 generate respective air-per-cylinder (APC) signals APC1 and APC2 based on the torque request signal $R_{Tq}$ and the valve lift state parameters stored in respective memories 164 and 166. The first APC signal APC1 may be associated with the first valve lift state S1. The second APC signal APC2 may be associated with the second valve lift state S2. The first torque module 170 may send the first APC signal APC1 to the first fuel estimation module 180 and the APC select module 188. The second torque module 172 may send the second APC signal APC2 to the second fuel estimation module 182 and the APC select module 188.

The power estimation module 176 generates an engine power estimate signal EPE based on an engine speed signal $\omega_E$ and the torque request signal $R_{Tq}$. The engine speed signal $\omega_E$ may be generated by the engine speed sensor 145. The power estimation module 176 may send the engine power estimation signal EPE to the first and second BSFC modules 184, 186.

The first and second fuel estimation modules 180 and 182 may generate a first engine fuel estimate signal FE1 and a second engine fuel estimate signal FE2 based on the first and second APC signals APC1 and APC2, respectively. The first engine fuel estimate signal FE1 may be associated with the first valve lift state S1. The second engine fuel estimate signal FE2 may be associated with the second valve lift state S2. The first fuel estimation module 180 may send the first fuel estimation signal FE1 to the first BSFC module 184 and the fuel select module 190. The second fuel estimation module 182 may send the second fuel estimation signal FE2 to the second BSFC module 186 and the fuel select module 190.

The first and second BSFC modules 184 and 186 may generate a first BSFC signal BSFC1 and a second BSFC signal BSFC2 based on the engine power estimate signal EPE and the respective engine fuel estimate signals FE1 and FE2. The first BSFC signal BSFC1 may be associated with the first valve lift state S1. The second BSFC signal BSFC2 may be associated with the second valve lift state S2. The first and second BSFC modules 184 and 186 may send the respective first and second BSFC signals to the valve lift state module 158.

The APC select module 188 may generate a selected-APC command signal $APC_{cmd}$ based on the first and second APC signals APC1, APC2 and the valve lift select signal $S_{VL}$. The APC select module 188 may send the selected-APC command signal $APC_{cmd}$ to the throttle control module 146. The throttle control module 146 may generate the throttle control signal 110 based on the selected-APC command signal $APC_{cmd}$ to control the throttle actuator 108 of the engine 102.

The fuel select module 190 may generate a fuel-estimate select signal $FE_{cmd}$ based on the first and second engine fuel estimate signals FE1, FE2 and the valve lift select signal $S_{VL}$. The fuel select module 190 may send the fuel-estimate select signal $FE_{cmd}$ to the fuel control module 148. The fuel control module 148 may generate the fuel command signal 119 based on the fuel-estimate select signal $FE_{cmd}$ to control the fuel actuator 118 of the engine 102.

The operating condition module 159 may determine an engine operating condition and generate an engine operating condition signal 208 based on engine operating signals. The engine operating signals may include the accelerator pedal signal $P_{pedal}$, the engine speed signal $\omega_E$ and an intake manifold pressure signal 117a of FIG. 1. The intake manifold pressure signal 117a may be generated by the MAP sensor 117. The operating condition module 159 may determine the engine operating condition based on the accelerator pedal position signal $P_{pedal}$, the intake manifold pressure signal 117a and the engine speed signal $\omega_E$.

The valve lift state module 158 may select one of the first valve lift state S1 and the second valve lift state S2. The valve lift state module 158 generates the valve lift select signal $S_{VL}$ that indicates the selected one of the first valve lift state S1 and the second valve lift state S2. The valve lift state module 158 generates the valve lift select signal $S_{VL}$ based on the first and second BSFC signals BSFC1, BSFC2. The valve lift state module 158 may also generate the valve lift select signal $S_{VL}$ based on the engine operating condition signal 208. The valve lift state module 158 may send the valve lift select signal $S_{VL}$ to the APC select module 188 and the fuel select module 190. The valve lift state module 158 may also send the valve lift select signal $S_{VL}$ to the valve lift control module 150. The valve lift control module 150 may generate the valve control signal 152 according to the valve lift select signal $S_{VL}$ to control the valve lift actuator 144 of the engine 102.

Figure 3:
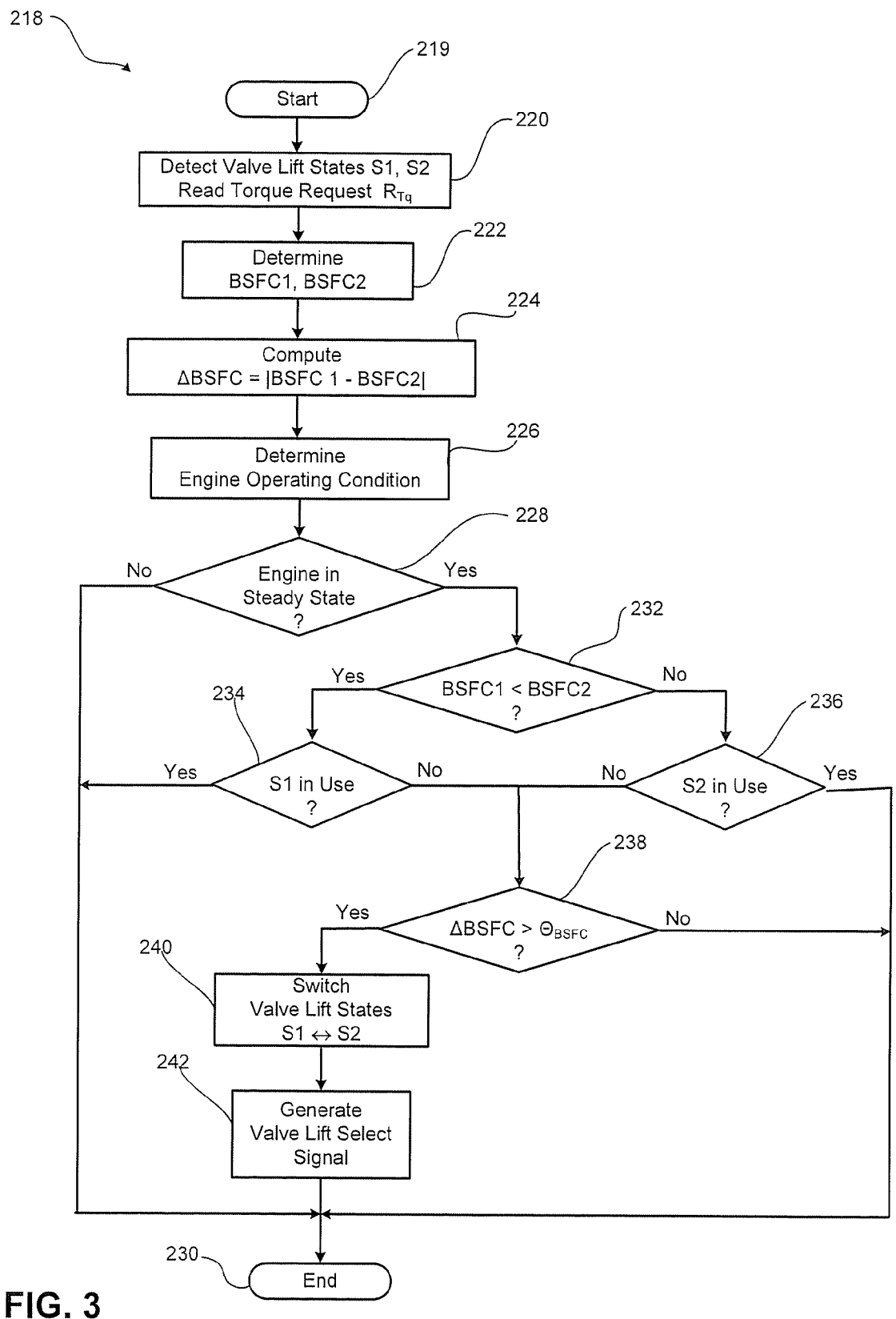
FIG. 3 illustrates a method of controlling valve lift according to the principles of the present disclosure.

Referring now also to FIG. 3, an exemplary method 218 for controlling valve lift is shown. Although the following steps are primarily described with respect to the embodiments of FIGS. 1 and 2, the steps may be applied to other embodiments of the present disclosure. Control of the fuel economy module 156, the valve lift state module 158 and the operating condition module 159 may execute the steps associated with the method 218. The method 218 may begin at step 219.

In step 220, the fuel economy module 156 detects a valve lift state of the engine 102. Two valve lift states, the first valve lift state S1 and the second valve lift state S2, for example may be detected. One of the valve lift states S1 and S2 may be used for valve control of the engine 102; the other one of the valve lift states S1 and S2 may not be used when the valve lift states are detected. The fuel economy module 156 may also detect the engine torque request signal $R_{Tq}$. The engine torque request signal $R_{Tq}$ may be generated by the driver command module 154.

In step 222, the fuel economy module 156 generates fuel consumption signals. The fuel consumption signals may be generated based on the engine power estimate signal EPE and the fuel estimate signals FE1 and FE2. The fuel economy module 156 generates the first and second BSFC signals BSFC1 and BSFC2 based respectively on the first fuel estimate signal FE1 and the second fuel estimate signal FE2. The BSFC signals may be generated, for example, using equations 1 and 2, $$BSFC1 = \frac{EPE}{FE1} \quad (1)$$

$$BSFC2 = \frac{EPE}{FE2} \quad (2)$$

The engine power estimate signal EPE may be generated based on the torque request signal $R_{Tq}$ and the engine speed signal $\omega_E$. The engine power estimate signal EPE may be generated by the power estimation module 176, for example, using equation 3, $$EPE = R_{Tq} * \omega_E \quad (3)$$

The first and second fuel estimate signals FE1, FE2 may be generated based on the respective APC signals APC1, APC2. The first and second fuel estimation modules 180, 182 may generate the fuel estimation signals FE1 and FE2, respectively, for example, using equation 4 and 5, $$FE1 = R_{F/A} * APC1 \quad (4)$$

$$FE2 = R_{F/A} * APC2 \quad (5)$$

The first fuel estimate signal FE1 may be associated with the valve lift state S1. The second fuel estimate signal FE2 may be associated with the valve lift state S2. $R_{F/A}$ is a predetermined ratio between air and fuel.

The APC signals in equations 4 and 5, APC1 and APC2 may be generated based on the engine torque request signal $R_{Tq}$. The first torque module 170 and the second torque module 172 may use an engine torque model to generate the APC signals, APC1, APC2. An exemplary engine torque model is disclosed in U.S. patent application Ser. No. 11/769,797 filed on Jun. 28, 2007.

In step 224, the fuel economy module 156 determines a difference between the first BSFC signal BSFC1 and the second BSFC signal BSFC2. A magnitude of the difference is also determined which is an absolute value of the difference.

In step 226, the operating condition module 159 may determine an engine operating condition and generate the engine operating condition signal 208. The engine operating condition may be one of a steady-state condition and a transient condition. The operating condition module 159 may determine the engine operating condition based on an accelerator pedal position or a throttle position. The operating condition module 159 may also determine the engine operating condition based on engine speed excursions or acceleration. The operating condition module 159 may also determine the engine operating condition based on a pressure signal generated by the MAP sensor 117.

The engine operating condition may be determined based on one of the signals of the accelerator pedal position, throttle position, engine speed, engine speed excursion, engine torque or manifold absolute pressure. The engine operating condition may also be jointly determined based on multiple signals of, for example, the accelerator pedal position, throttle position, engine speed, engine speed excursion, engine torque and manifold absolute pressure. In one embodiment, the operating condition module 159 may generate the engine operating condition signal 208 based on the accelerator pedal position signal $P_{pedal}$, the intake manifold pressure signal 117a and the engine speed signal $\omega_E$.

In step 228, control proceeds to step 232 to continue when the engine operating condition is a steady-state condition. Control proceeds to step 230 to end when the engine operating condition is a transient condition.

In step 232, the valve lift state module 158 compares the two BSFC signals BSFC1, BSFC2. Control proceeds to step 234 when the first BSFC signal BSFC1 is lower than the second BSFC signal BSFC2. Control proceeds to step 236 when the second BSFC signal BSFC2 is lower than the first BSFC signal BSFC1.

In step 234, the fuel economy module 156 detects that one of the first valve lift state S1 and the second valve lift state S2 is use for controlling a valve of the engine 102. Control proceeds to step 238 when the engine 102 is operating in the second valve lift state S2. Control proceeds to step 230 to end when the engine is operating in the first valve lift state S1.

In step 236, the fuel economy module 156 detects that one of the first valve lift state S1 and the second valve lift state S2 is used for controlling a valve of the engine 102. Control proceeds to step 238 when the engine 102 is operating in the first valve lift state S1. Control proceeds to step 230 to end when the engine is operating in the second valve lift state S2.

In step 238, the magnitude ΔBSFC of the difference between the two BSFC signals BSFC1 and BSFC2 is compared with a predetermined threshold $\theta_{BSFC}$. Control proceeds to step 240 when the magnitude is greater than the threshold. The threshold $\theta_{BSFC}$ may have a value greater than or equal to zero. The valve lift state module 158 may execute step 238.

In step 240, the valve lift state module 158 determines a valve lift state for operation of the engine 102 by switching between the valve lift states S1 and S2. In step 242, the valve lift state module 158 generates the valve lift select signal $S_{VL}$ to indicate the selected one of the valve lift states S1 and S2.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel control system of an engine comprising:
 a fuel economy module that:
  determines a first valve lift state and a second valve lift state of a valve of the engine,
  generates a first fuel consumption signal based on first parameters associated with the first valve lift state and an engine torque request signal, and
  generates a second fuel consumption signal based on second parameters associated with the second valve lift state and the engine torque request signal,
  wherein the first and second parameters include values of valve lift, valve timing, and spark timing associated with the first and the second valve lift states; and
 a valve lift state module that selects one of the first valve lift state and the second valve lift state based the first fuel consumption signal and the second fuel consumption signal,
 wherein the valve lift state module generates a valve lift select signal that indicates the selected one of the first valve lift state and the second valve lift state.

2. The fuel control system of claim 1, wherein the first valve lift state corresponds to a first cam profile, and wherein the second valve lift state corresponds to a second cam profile.

3. The control system of claim 1, wherein the first fuel consumption signal and the second fuel consumption signal are brake specific fuel consumption signals.

4. The control system of claim 1, wherein the first fuel consumption signal and the second fuel consumption signal are generated based on an engine power estimate and an engine fuel estimate.

5. The control system of claim 1, wherein the first fuel consumption signal and the second fuel consumption signal are generated based a model of engine torque.

6. The control system of claim 1, wherein the valve lift state module selects the one of the first valve lift state and the second valve lift state based on a lower one of the first fuel consumption signal and the second fuel consumption signal.

7. A fuel control system of an engine comprising:
a fuel economy module that:
determines a first valve lift state and a second valve lift state of a valve of the engine,
generates a first fuel consumption signal based on the first valve lift state and an engine torque request signal, and
generates a second fuel consumption signal based on the second valve lift state and the engine torque request signal; and
a valve lift state module that selects one of the first valve lift state and the second valve lift state based the first fuel consumption signal and the second fuel consumption signal,
wherein the valve lift state module generates a valve lift select signal that indicates the selected one of the first valve lift state and the second valve lift state,
wherein the fuel economy module determines a difference between the first fuel consumption signal and the second fuel consumption signal, and
wherein the valve lift state module determines a magnitude of the difference and generates the valve lift select signal when the magnitude is greater than a threshold.

8. The control system of claim 1 further comprising an operating condition module that determines an operating condition of the engine, wherein the operating condition is one of a steady-state condition and a transient condition, and
wherein the valve lift state module generates the valve lift select signal when the operating condition is the steady-state condition.

9. The control system of claim 8, wherein the operating condition module determines the operating condition based on an accelerator pedal position signal, an intake manifold pressure signal and an engine speed signal.

10. A method of controlling fuel consumption of an engine comprising:
detecting that a first valve lift state is used for a valve of the engine and a second valve lift state is not used for the valve;
generating a first fuel consumption signal based on first parameters associated with the first valve lift state and an engine torque request signal, wherein the first parameters include values of valve lift, valve timing, and spark timing associated with the first valve lift state;
generating a second fuel consumption signal based on second parameters associated with the second valve lift state and the engine torque request signal, wherein the second parameters include values of valve lift, valve timing, and spark timing associated with the second valve lift state; and
switching from the first valve lift state to the second valve lift state for the valve based on the first fuel consumption signal and the second fuel consumption signal.

11. The method of claim 10, wherein the first valve lift state corresponds to a first cam profile, and the second valve lift state corresponds to a second cam profile.

12. The method of claim 10, wherein the first fuel consumption signal and the second fuel consumption signal are brake specific fuel consumption signals.

13. The method of claim 10, wherein the first fuel consumption signal and the second fuel consumption signal are generated based on an engine power estimate and an engine fuel estimate.

14. The method of claim 10, wherein the first fuel consumption signal and the second fuel consumption signal are generated based a model of engine torque.

15. The method of claim 12 further comprising
switching from the first valve lift state to the second valve lift state when the second fuel consumption signal is lower than the first fuel consumption signal.

16. A method of controlling fuel consumption of an engine comprising: detecting that a first valve lift state is used for a valve of the engine and a second valve lift state is not used for the valve;
generating a first fuel consumption signal based on the first valve lift state and an engine torque request signal;
generating a second fuel consumption signal based on the second valve lift state and the engine torque request signal;
switching from the first valve lift state to the second valve lift state for the valve based on the first fuel consumption signal and the second fuel consumption signal;
determining a difference between the first fuel consumption signal and the second fuel consumption signal;
determining a magnitude of the difference; and
switching from the first valve lift state to the second valve lift state when the magnitude is greater than a threshold.

17. The method of claim 10 further comprising:
determining an operating condition of the engine, wherein the operating condition is one of a steady-state condition and a transient condition; and
switching from the first valve lift state to the second valve lift state when the operating condition is the steady-state condition.

18. The method of claim 17, wherein the operating condition is determined based on an accelerator pedal position signal, an intake manifold pressure signal and an engine speed signal.

19. The control system of claim 1, wherein the fuel economy module determines a difference between the first fuel consumption signal and the second fuel consumption signal, and wherein the valve lift state module determines a magnitude of the difference and generates the valve lift select signal when the magnitude is greater than a threshold.

20. The method of claim 10 further comprising:
determining a difference between the first fuel consumption signal and the second fuel consumption signal;
determining a magnitude of the difference; and
switching from the first valve lift state to the second valve lift state when the magnitude is greater than a threshold.

* * * * *